March 17, 1953

A. A. SHAMES

2,631,428

MULTIPLE FLUID-OPERATED ROTARY GEAR MOTORS
WITH TREATMENT BETWEEN STAGES

Filed Aug. 28, 1946

Inventor:
Albert A. Shames,
by Yardley Chittick
Attorney

Fig. 3.

March 17, 1953  
A. A. SHAMES  
2,631,428  
MULTIPLE FLUID-OPERATED ROTARY GEAR MOTORS WITH TREATMENT BETWEEN STAGES  
Filed Aug. 28, 1946  
6 Sheets-Sheet 4

Inventor:  
Albert A. Shames  
by Chadley Cuttick  
Attorney

Patented Mar. 17, 1953

2,631,428

UNITED STATES PATENT OFFICE 2,631,428

MULTIPLE FLUID-OPERATED ROTARY GEAR MOTORS WITH TREATMENT BETWEEN STAGES

Albert A. Shames, Waban, Mass., assignor to Arthur H. Nelson, Lawrence, Kans., and John F. Hassler, Jr., Beverly Hills, Calif.

Application August 28, 1946, Serial No. 693,503

10 Claims. (Cl. 60—39.17)

This invention relates to a prime mover comprising a rotary type positive displacement gas engine.

The principal object of the invention is to provide an engine of the rotary type as hereinafter described which will have adequate torque characteristics over the range of loads to be applied and many of the advantages of gas turbines without the disadvantages of high rotating speeds. The engine will also have adequate flexibility to eliminate the need of multiple speed transmissions. It will have vibration and sound characteristics which will be at least as satisfactory as those of the average internal combustion engine now in use. It will be made of relatively few parts, designed for long life, and the engine will have such other attributes as may be required to render it satisfactory for use in automotive vehicles and airplanes.

The invention consists in the general combination of the various elements and parts which will hereinafter be described, as well as in the particular construction of individual elements. Many of the individual parts used in the general combination are conventional, and to those parts no claim is made.

The invention also includes a new method of multiple stage combustion, which method may be used not only in the present type of engine but also in reciprocating engines and turbines.

The invention will be more clearly understood by the description which follows, aided by the accompanying drawings, in which.

In order that the nature of the invention may be generally understood at the outset, the complete assembly will be described broadly with more particular descriptions of the various parts to follow.

Figure 1:
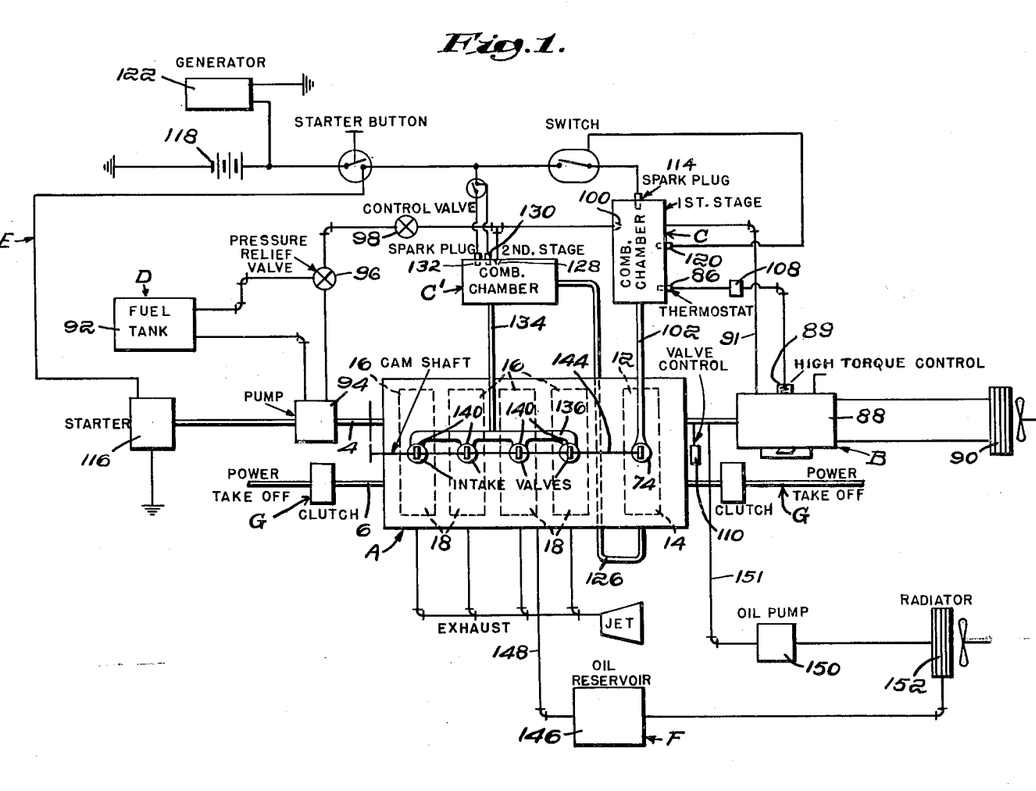
Fig. 1 is an over-all diagrammatic sketch of my rotary positive displacement gas engine.

Referring to Fig. 1, A designates generally a rotary engine which consists of one or more stages. B is the compressor assembly and its related parts designed to supply a sufficient quantity of air under adequate pressure to one or more combustion chambers C and C'. A fuel supply system D furnishes chambers C and C' with adequate quantities of fuel, of which preferred forms would be hydrocarbons such as kerosene, gasoline, diesel oil, etc. An electrical system E provides for starting and operation of any auxiliary electrical equipment that may be desired.

The engine is lubricated by a lubrication system designated F. The power from the engine may be taken off the shafts at either end through suitable take-offs G. Clutches may or may not be included to meet the needs of the particular service to which the engine is put.

In general, the engine consists of one or more stages of rotary pistons, the first stage including a single pair of meshing piston gears, while the second and following stages consist of additional pairs of piston gears of the same general character as those of the first stage, but in sufficient number to receive the increased volume of lower pressure gases flowing to the subsequent stage from the preceding stage. Ordinarily, the gears of all stages will be substantially identical, but the size may be varied if desired to meet particular conditions. The engine has two shafts to which the rotating piston gears are keyed or otherwise secured, and power may be taken from either or both of the shafts. In Fig. 1, one of the shafts is shown as operating the compressor unit B, the fuel pump of the fuel system D, and in addition is subject to the influence of the starting motor in the electrical system E.

The compressor B may be a single or multiple stage compressor, feeding compressed air to the first stage combustion chamber C where it burns with fuel from the fuel system D to provide high temperature compressed gas for the first stage of the engine. The quantity of air supplied by the compressor is preferably in excess of the amount needed to provide complete combustion of the fuel, thus limiting the temperature rise.

The electrical system supplies the necessary voltage and current to operate a spark plug in the combustion chamber until initial combustion of the explosive mixture has taken place. After combustion is under way in the combustion chamber C, burning thereafter is continuous, so that further operation of the spark plug may be discontinued. Automatic means for breaking the spark plug circuit are provided.

The burned gases in the combustion chamber obviously produce a very high pressure therein. This hot compressed gas is then led to the engine through a suitable passage where its flow is controlled by an intake valve which may be opened intermittently or be held open continuously. The compressed gas acts either directly at the combustion chamber pressure on the rotating pistons if the valve is held open, or through expansion and a drop in temperature after the intake valve operating intermittently has been closed, to cause rotation of the geared teeth and connected shafts.

If the engine is the single stage type, the gases will exhaust from the first stage and pass to the atmosphere. If a two stage engine, then the gases are fed into a second stage combustion chamber C', from which they may pass to the second stage. If desired, an additional quantity of fuel may be fed into the second stage combustion chamber C' to combine with the surplus oxygen unused in the first stage. After the gases have done their work in the second stage, they may be exhausted to the atmosphere, or if there is sufficient energy remaining they may be used in a third stage in a similar manner.

Ordinarily, the discharge pressure will be so low that the use or need of a muffler is eliminated. The exhaust gases may, in connection with certain installations, be at a velocity high enough to warrant their being discharged through a jet so as to provide additional propulsion. This would be the case particularly in airplane installations.

In general, a plurality of fuel burning points is preferable so that it will be unnecessary to raise the temperature excessively in the first stage combustion chamber. The pressure generated in the second stage combustion chamber as the fuel added therein is burned with the excess air that still remains in the charge leaving the first stage is less than that in the first stage combustion chamber. The net difference in these pressures provides for the effective work done by the first stage, and the difference in pressure between the second stage combustion chamber and the next stage, or the atmosphere if a subsequent stage is not used, provides for the effective work done by the second stage.

The fuel supply system D comprises a fuel tank, a motor driven fuel pump, and a pressure relief valve, all designed to deliver the fuel at a constant pressure to the injector nozzles in each of the combustion chambers. The speed of the engine is controlled by the quantity of fuel fed to the one or more combustion chambers. Thus, the operator, through manual operation of the control valve, can cause the engine to operate at any desired speed.

When large amounts of power are required under particular circumstances where economy can be temporarily forgotten, means is provided for holding the engine intake valves open, so that the high pressures in the combustion chambers are made immediately and continuously available to the engine. In such case, the gears are caused to rotate by the direct pressures available in the combustion chambers rather than by the more economical process of permitting the compressed gases to expand after being cut off by the valves.

In order that the engine may operate successfully for long periods, it is necessary that the temperature be kept within a range which can be continuously maintained without damage to the various types of materials that are present. Thus, it is necessary that the compressor be either a single stage type of excess capacity, or have one or more additional stages which may be thrown into operation to supply surplus air to the combustion chamber at the same time that larger quantities of fuel are demanded for heavy load operations.

To minimize wear of the engine, it is contemplated that the rotating gears forming the piston areas and the surrounding cylinders will be entirely free of each other at all times. The clearances involved, however, are so slight that there is substantially no gas leakage. Carbon formations will improve rather than hamper the operation.

The piston gears are maintained in this close clearance relationship through the use of very accurate helical gears mounted on the two shafts outside of the high temperature regions of the engine. These helical gears control the angular relationship of the shafts and piston gears at all times. In the drawings that will be described in more detail hereinafter there is shown but a single pair of helical gears at one end of the engine, but it will be understood that a second pair of helical gears may be installed at the other end of the engine in order to minimize any tortional distortion that would otherwise develop in the engine shafts. Because of the clearance present in the engine, it is contemplated that the piston gears and the cylinder walls may be made of ceramic material, as well as of the usual metals. Ceramic construction would permit operation at temperatures above those now possible if metals alone were used.

The lubrication system is relatively simple. The only engine parts that need oil are the shaft bearings, which may be ball or roller or otherwise, as seems expedient, and the helical gears and the cam shafts. The oil supply system includes a pump which may be operated directly or indirectly by either of the engine shafts.

In order to keep the oil at a proper temperature, a cooling system may likewise be deemed necessary. Similarly, since the compression of the air generates large quantities of heat, a cooling system may be included for the air compressor.

Engine

The engine proper is shown in detail in Figs. 2–7, inclusive. The intake valves controlling the admission of compressed gas to the engine are shown diagrammatically in Fig. 1, and more particularly in Figs. 3, 4, 5, 6, 7 and 8.

Figure 2:
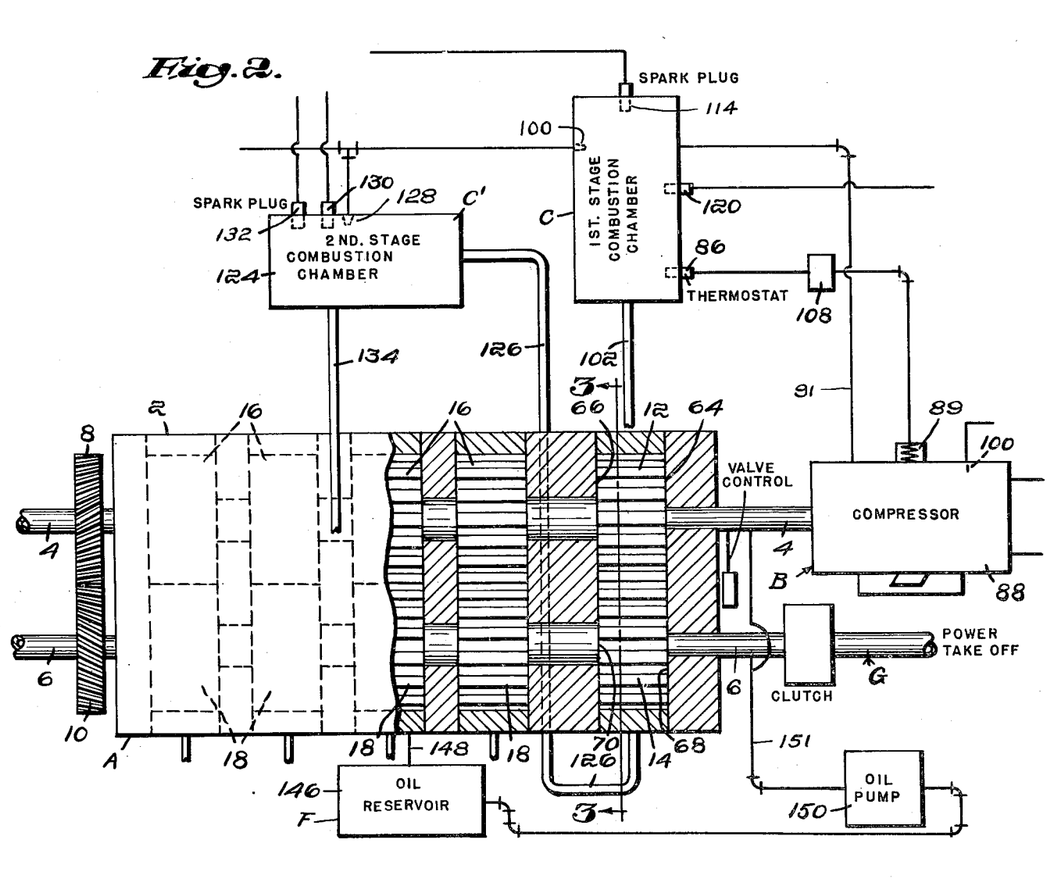
Fig. 2 is a side elevation of the engine broken away in part to show the piston and bearing arrangement with some of the auxiliary equipment shown diagrammatically.

Referring to Fig. 2, the engine consists of an outer housing or cylinder block 2 having extending therethrough a pair of parallel shafts 4 and 6. Fixed on the shafts beyond the engine proper are a pair of helical gears 8 and 10. These gears are accurately made so that there is no back lash or play therebetween.

The first stage piston gears are shown in Fig. 2 at 12 and 14 and the four sets of second stage piston gears at 16 and 18. All of the second stage piston gears 16 and 18 are identical. All gears are secured to their respective shafts.

Figure 3:
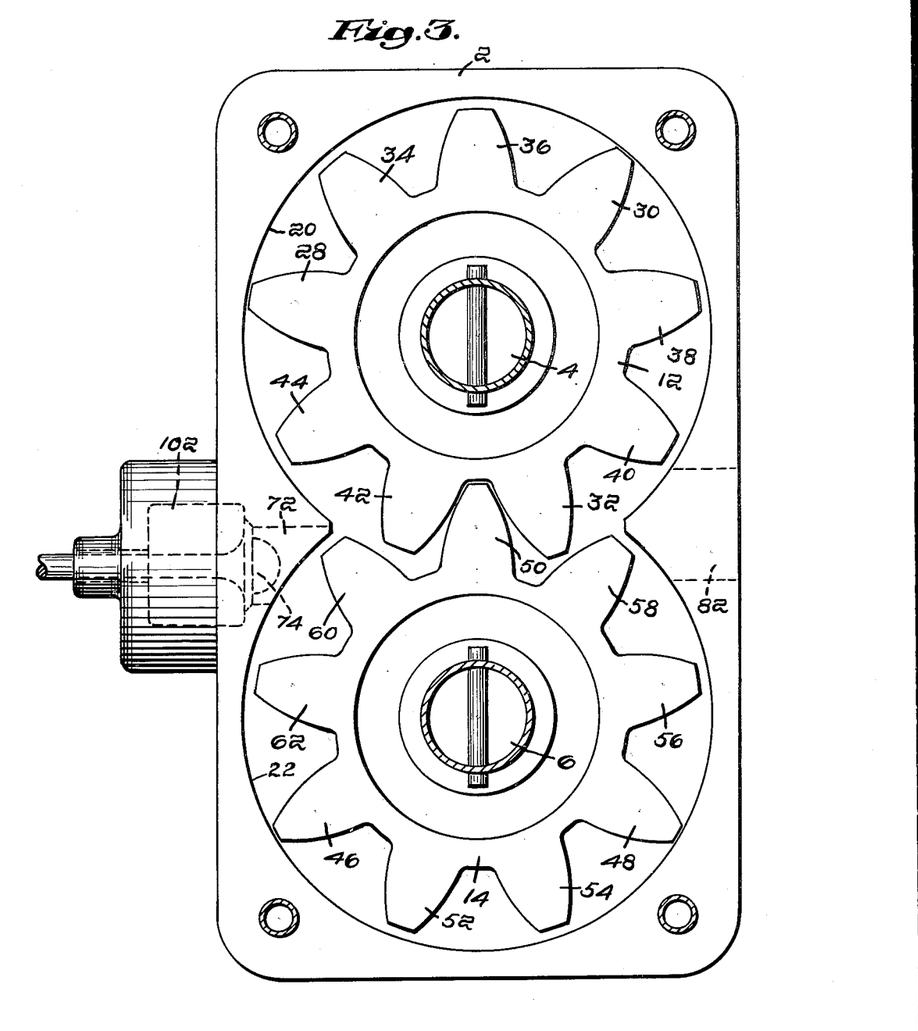
Fig. 3 is a vertical section on the line 3—3 of Fig. 2.
Figure 4:
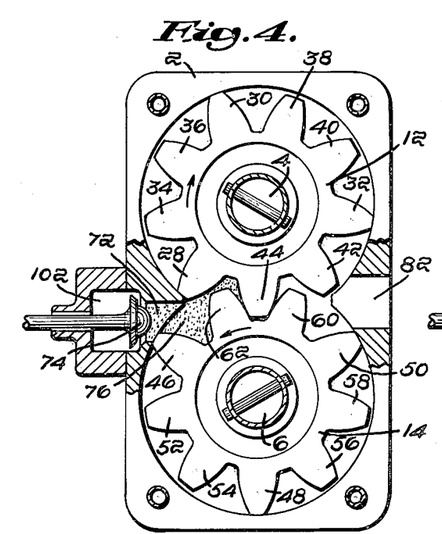
Fig. 4 is a view similar to Fig. 3, with one set of teeth being approximately in the position of initial gas admission.

The nature of the piston gears is shown clearly in Fig. 3, which is a section on the line 3—3 of Fig. 2. The cylinder block 2 has two intersecting circular cylinder walls 20 and 22, through which extend the shafts 4 and 6 located coaxially with the circular cylinder walls. To shaft 4 is pinned piston gear 12 and to shaft 6 is pinned piston gear 14. Gears 12 and 14 mesh with each other as shown.

Each gear consists of nine teeth, with every third tooth longer than the other two. The long teeth in gear 12 are numbered 28, 30, and 32, while the intermediate short teeth are numbered 34, 36, 38, 40, 42, and 44. The long teeth on gear 14 are numbered 46, 48 and 50, while the intermediate short teeth are numbered 52, 54, 56, 58, 60 and 62.

The spacing of shafts 4 and 6 and the teeth formations are such that, when properly adjusted, piston gears 12 and 14, controlled by the outside helical gears 8 and 10, will not touch each other or the surrounding cylinder walls 20 and 22 during operation. That is to say, there is minute clearance between the teeth of the piston gears and their respective cylinders. Thus tooth 50 is not touching tooth 32 or 42, and the ends of long teeth 28, 30, 46, and 48 are not touching the cylinder walls. The clearances, however, are so slight that there is substantially no leakage of gas past the piston teeth. It will be understood that the clearances shown in Fig. 3 are illustrative only, and are much greater than the clearances in the actual engine.

Similarly, the end walls of the cylinders of the first stage shown in Fig. 2 and numbered 64, 66, 68, and 70 fit very closely against the sides of the gears, but do not touch them. This obviously calls for accurate machining of the gears, but is quite within the scope of present-day practice.

The description of the first stage gears shown in Fig. 3 is applicable to all of the gears used in a second or subsequent stage of the engine. In the second or any other subsequent stage, it might be expedient to vary the angular position of the gears somewhat for the purpose of improving the timing, but that is a matter for determination by the engine builder. In general, the position of the gears in subsequent stages is immaterial, as the timing can be adequately controlled by the cams which control the opening and closing of the intake valves.

Reference to Figs. 3 to 7 will show plainly the nature and extent of the rotary pistons and rotating expansion chambers. Attention is called to the fact that while the long teeth and the meshing teeth are shown as touching in Figs. 3 to 7, there is in fact minute clearance therebetween, as heretofore explained.

An admission port 72 is provided, which, it will be noted, is off center. The purpose of the eccentricity is to permit piston tooth 46 (see Fig. 4) to clear one side of the admission port 72 as piston tooth 28 clears the other. At this position a poppet valve 74 controlled by a cam 104 on cam shaft 106 driven by shaft 4 or 6 will open to admit to the initially formed expansion chamber 76 the hot compressed gases generated in the first stage combustion chamber. Gas so admitted exerts a force against the rear side of each of teeth 28 and 46 and a pressure against the forward side of tooth 44. Thus there is exerted an effective rotational force equal to the area of one tooth times the pressure of the admitted gas. This immediately causes rotation of the meshing piston gear teeth, three of the positions being successively shown in Figs. 5, 6 and 7.

Figure 5:
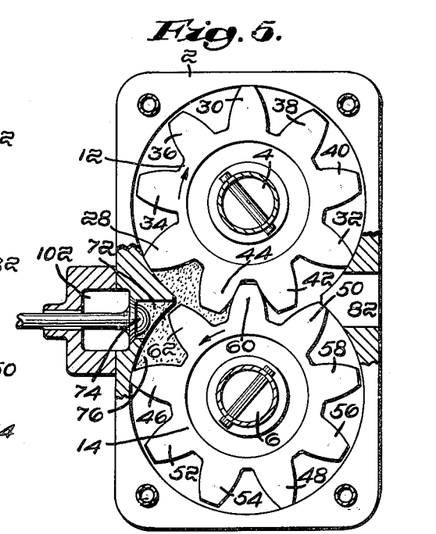
Fig. 5 is a view similar to Fig. 4, with the teeth having advanced somewhat to an intermediate position.
Figure 6:
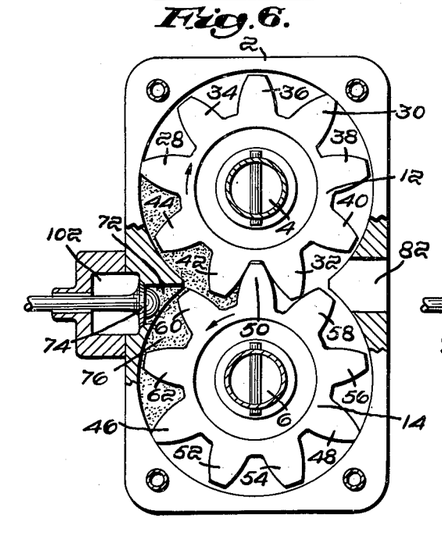
Fig. 6 is a view similar to Fig. 4, with the teeth having advanced well along toward the point of maximum expansion.
Figure 7:
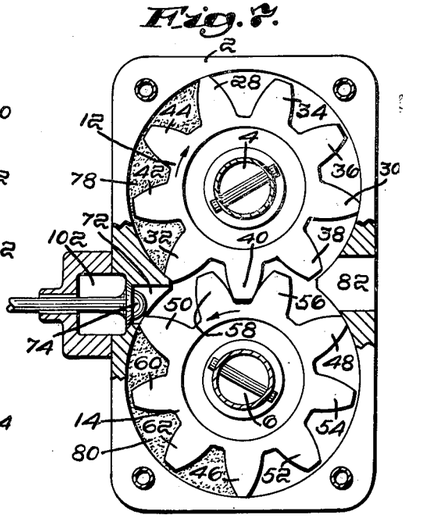
Fig. 7 is a view similar to Fig. 4, with the teeth having passed beyond the point of further effective expansion of the piston area.

For efficient operation, valve 74 should not remain open continuously, and, accordingly, in Fig. 5 the valve is shown as having closed. The gas contained in the initial small volume expansion chamber 76 is under sufficient pressure to expand and enlarge the chamber, thereby rotating the gears. The temperature is reduced correspondingly. The volume of the expansion chamber 76 continually increases in the manner shown in the shaded areas until finally the gears reach the position shown in Fig. 7, at which time the next long tooth 32 on gear 12 and the next long tooth 50 on gear 14 have advanced to the original positions of teeth 28 and 46 shown in Fig. 4. At this point, as shown in Fig. 7, the expansion chamber 76 has split into two halves 78 and 80, each of fixed volume, and no further expansion of the gas in these chambers can take place. All available power that can be extracted from the gas in the first stage has been utilized. Thereafter, poppet valve 74 again opens to admit a new charge of compressed gas into the newly created expansion chamber that will follow along behind teeth 32 and 50. The cycle just described is continuously repeated, and as long as gas under suitable pressure is supplied the engine will continue to run.

It will be understood, of course, that if valve 74 is held open instead of operating intermittently, the full pressure of the combustion chamber will be exerted continuously against the long piston teeth to provide a greater amount of continuous power than is available when the entering charge is intermittently cut off by valve 74. Thus, when sudden surges of power are required without regard to efficiency, such performance may be had by maintaining valve 74 open.

After the expansion chamber has reached the split condition, as indicated by areas 78 and 80 in Fig. 7, the gas contained therein will be carried around the cylinder walls 20 and 22 until the leading long piston teeth 28 and 46 pass the edges of exhaust port 82, at which time the contained gases still being at pressures in excess of atmospheric, expand further and flow out through the exhaust port, traveling either to the atmosphere or to the combustion chamber C' of the second stage.

Figure 9:
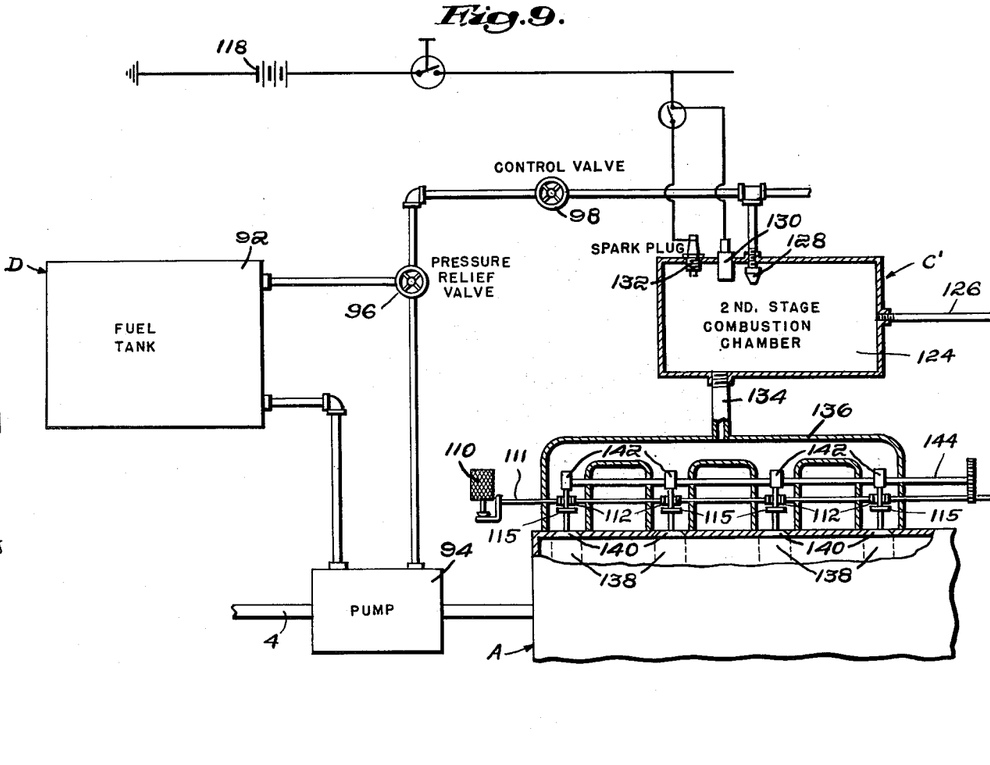
Fig. 9 is a diagrammatic view of some of the auxiliary equipment associated with the second stage combustion chamber.

If a second stage is utilized, the exhaust gases of the first stage will be collected in the second stage combustion chamber C', shown in Figs. 1, 2, and 9, from which they may be fed by an intake manifold to the piston gears 16 and 18 of the second stage at the pressure and temperature then available. The pressure and temperature of the second stage may be increased by the introduction of additional fuel which will combine with the excess oxygen present in the exhaust from the first stage. In either event, however, the admission of the compressed gas to the second stage is controlled in the identical manner heretofore described with respect to the first stage. That is to say, there is an intake valve for each pair of second stage piston gears, and these valves are cam operated in the manner of the first stage valve. Furthermore, the second stage intake valves may be held open along with the first stage valve when excess power is required.

After the gases have expanded and done their work in the second stage, they will be exhausted therefrom to the atmosphere either direct or through a muffler or jet. Ordinarily, in automotive use, a muffler will not be required because the exhaust pressure will be only slightly above atmospheric and hence relatively quiet.

Generally speaking, a third stage would not be used, but if desired, the construction and operation will be identical with those heretofore described with respect to the first and second stages.

Fuel system

The fuel system comprises a fuel tank 92, a fuel pump 94, which is shown in Fig. 1 as being driven by shaft 4, and a pressure relief valve 96 designed to provide constant pressure at the control valve 98. Manual operation of valve 98 in turn controls the quantity of fuel that will be injected into the combustion chambers in a unit time. Conventional injection nozzles, indicated at 100 in Fig. 8 and 128 in Fig. 9, are utilized to effectively spray the fuel into the combustion chambers C and C' to mix with the incoming compressed air to the degree necessary to insure complete combustion. The fuel pump is designed to provide sufficient pressure to cause proper injection against whatever pressures are present in the combustion chambers.

*First stage combustion chamber*

The gases that do the work in the engine are initially and continuously burned in the first stage combustion chamber C, into which compressed air and fuel are being continuously fed. The compressed air is supplied through line 91 from compressor 88 and the fuel is sprayed from nozzle 100. The result of this burning is to produce gases at a high temperature and pressure sufficient to generate the required engine horsepower.

Figure 8:
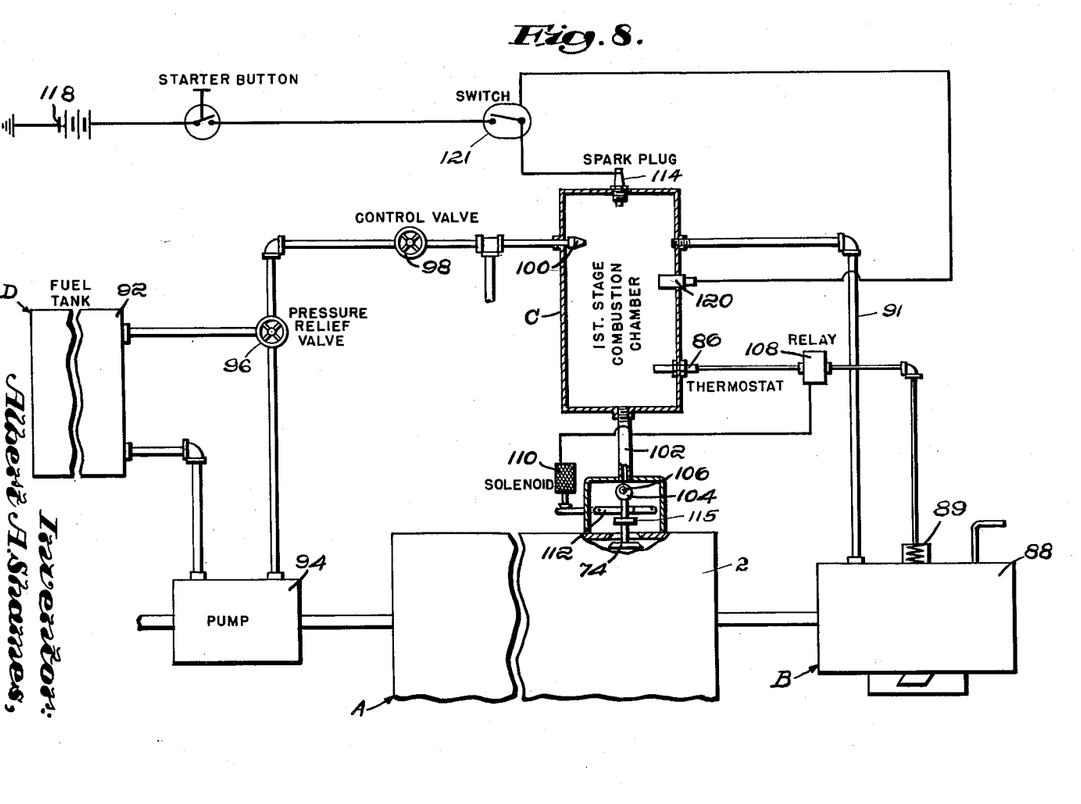
Fig. 8 is a diagrammatic view of some of the auxiliary equipment associated with the first stage combustion chamber.

Referring to Figs. 2 and 8, it will be noted that the gas generated in the first stage combustion chamber C passes through a port 102 to the first stage of the engine. Port 102 is intermittently opened and closed through the operation of intake valve 74, which is controlled by cam 104 on cam shaft 106. The opening and closing of valve 74 under the influence of cam 104 is timed with respect to the position of the long teeth on the piston gears. The power output of the engine can be increased by lengthening the period for which valve 74 is open or by raising the combustion chamber pressure through burning more fuel. The maximum power output for a given fuel consumption may be obtained by holding valve 74 continuously open for the period required.

*Second stage combustion chamber*

On referring to Fig. 9, the details of the second stage combustion chamber C' will be seen. This chamber 24 has leading to it a passage 126 through which come the expanded reduced temperature gases exhausted from the first stage of the engine through exhaust port 82. In addition, a fuel injection nozzle 128, which along with nozzle 100 of the first stage combustion chamber is under the joint control of valve 98, discharges into the chamber. Since the gas from the first stage contains an uncombined excess of oxygen, the second stage pressure and temperature may be increased by the injection of a limited amount of fuel from nozzle 128. The temperature in the second stage combustion chamber is sufficiently high so that automatic and continuous burning of the added fuel takes place. If, however, the temperature should fall below the combustion point, an automatic thermostatic control 130 will be effective to bring spark plug 132 into operation to cause combustion. The gases from the second stage combustion chamber will pass through an intake passage 134 to an intake manifold 136, whence they are distributed to the piston gears of the second stages 138 of the engine. The piston gears of the second stages are shown at 16 and 18 in Fig. 2.

Each pair of piston gears of the second stage has its own intake valve 140, and all of these valves are controlled by cams 142 on cam shaft 144 in the manner heretofore described in connection with the operation of valve 74 of the first stage.

*Compressor*

In order that a sufficient quantity of compressed air may be available in the first stage combustion chamber C to burn with the steady supply of injected fuel, it is essential that a suitable compressor be provided to be driven by part of the power generated by the engine. Accordingly, in the present construction it is proposed to have a positive displacement or rotary compressor of suitable capacity driven by one or both of the engine shafts. In Fig. 2 the compressor 88 is attached to shaft 4.

When the engine is called upon to do a greater amount of work at the same speed, more fuel must be injected. If the temperature is to be maintained, the compressor must at that time provide additional quantities of air to burn with the increased supply of fuel. Accordingly, automatic controls are provided which will open a by-pass in the compressor or throw into operation a second or third compressor stage whenever there is any appreciable temperature increase in the combustion chamber.

The additional air thus supplied will automatically reduce the combustion chamber temperature to hold it within the operating limits while at the same time providing the additional power output required. Referring to Figs. 2 and 8, there is shown in the first stage combustion chamber C a thermostat 86 which controls additional output of the compressor 88 through the automatic operation of the high torque control 89. The equipment referred to is conventional, and accordingly neither the thermostat 86, the high torque control 89, nor the compressor 88 need be described in detail.

Since a large amount of heat is generated in compressing the air to the degree required, there is preferably included a cooling system utilizing water, a radiator and a fan. This arrangement is diagrammatically indicated at 90 in Fig. 1.

No valves are needed in the line 91 from the compressor because the compressor, being of the positive displacement type, will always supply air at a pressure somewhat in excess of the pressure generated in the combustion chamber.

*Electrical system*

The electrical system required is very simple. It conforms in part to the electrical system on ordinary internal combustion engines in that there is a starting motor 116 operated by a battery 118. The starting motor will act through suitable gearing on one or both of the engine's shafts, causing rotation at a sufficiently rapid rate to bring enough air and fuel into the first stage combustion chamber C to produce a combustible mixture capable of being ignited by spark plug 114. As soon as the temperature in the combustion chamber rises, an automatic thermostatic control 120 breaks the spark plug circuit at switch 121, so that the operation of the spark plug ceases. Combustion of the fuel and air is thereafter continuous so long as the engine remains in operation.

The spark plug 132 in the second stage combustion chamber C', while not utilized to start the engine, nevertheless functions when necessary to insure complete burning of the fuel additionally supplied by nozzle 128. Thermostatic control 130 cuts out the spark plug 132 when the chamber temperature is high enough to support combustion without auxiliary ignition.

Lubrication system

Referring to Fig. 1, a diagrammatic showing of the lubrication system is disclosed. This system consists of an oil reservoir 146 which receives the oil through pipe 148 as it drains away from the engine. This oil is forced by pump 150 through pipe 151 to the engine, being cooled on its way by a radiator 152.

It will be noted on referring to Fig. 3 that shafts 4 and 6 are hollow. The oil flowing to the engine through pipe 151 is not only used to lubricate the shaft bearings, but also by passing through hollow shafts 4 and 6 serves to hold the temperature of the shafts and bearings sufficiently low to permit continuous operation without danger of overheating these elements.

In addition to lubrication of the shafts 4 and 6 and their bearings, it will be understood that the oil is also forced to helical gears 8 and 10 and cams, cam shafts, valves, etc. It is unnecessary, however, to provide any lubrication for the rotating piston gears, which run dry because of the clearance between the teeth and cylinder walls.

Power take-off

Power generated by the engine may be taken off either directly or through any suitable clutch mechanism. In automotive installations having direct drive, stopping of the vehicle would require stopping the engine. This arrangement would, however, require a pressure reservoir or auxiliary system capable of re-starting the engine under load. In the preferred arrangement a clutch would be included, so that upon bringing the vehicle to a halt the engine would continue to run at low power output. The clutch could be of the mechanical or fluid type.

High output control

Automatic means is provided for holding the intake valves of both the first and second stages open when a temporary high power output is required. This mechanism is disclosed in Figs. 8 and 9, and consists of a solenoid 110 operated by a thermostatic element 86 located in the first stage combustion chamber and a relay 108.

Solenoid 110, upon being actuated, causes partial rotation of shaft 111, which in turn swings connected levers 112 downwardly against abutments 115 of valves 74 and 140, thus simultaneously opening all intake valves.

Cam shafts 106 and 144 continue rotation, but are ineffective to move the valves, since the upper ends of the valve stems are out of reach of cams 104 and 142.

Operation

The operation of the engine is as follows. The starter button is closed, which causes the actuation of the starter and rotation of the engine. Spark plug 114 in the first stage combustion chamber commences firing, fuel is supplied through nozzle 100, and compressed air through pipe 91. Thus combustion in the first stage combustion chamber is inaugurated, and the gases so produced are immediately fed to the first stage of the engine. At this point operation may be said to have commenced. The starter circuit may be broken as soon as the engine starts.

While not shown in the drawings, it will be understood that the starter could be arranged to operate only the fuel pump and compressor, to produce the initial combustible mixture. Upon firing, the compressed hot gas would flow to the first stage to initiate engine rotation.

The gas exhausting from the first stage of the engine passes to the second stage combustion chamber C', where it receives some additional fuel through nozzle 128, which fuel burns with the excess unconsumed air. The second stage burning is spontaneous if the temperature is sufficiently high, or may be induced by the operation of spark plug 132 if the temperature is below the combustion point.

The gases of the second stage combustion chamber, which are still at relatively high temperature and pressure, although below that of the first stage combustion chamber, are fed into the second stage of the engine to increase the power output. The gases from the second stage exhaust either to the atmosphere or to a third stage combustion chamber if one is used.

When a greater speed is required, the operator increases the opening of valve 98, which causes more fuel to be fed to the combustion chambers. If this fuel increase is gradual, the temperature change will be slight, because correspondingly increased quantities of air are being fed to the combustion chambers by the compressor, which increase holds down the temperature.

If more power at the same speed is required, the operator opens valve 98 to the extent necessary. Since there will be no change in the compressor speed, there will be no change in the air input to the first stage combustion chamber. There will be, however, an increase in the fuel supplied. The temperature and pressure will rise accordingly, thus making available more energy to drive the engine at the same speed but higher power output. In this situation, the temperature will not rise to the degree necessary to actuate thermostat 86, and hence the valves 74 and 140 continue their cam controlled intermittent operation.

When immediate high power output is required, then the operation is as follows. The operator will open valve 98 wide to cause a heavy increase in the fuel supply to the combustion chambers. Since there is normally an excess of air present in both combustion chambers, this excess fuel will be burned, but in so doing the temperature and pressure in the combustion chambers will immediately rise substantially.

The increased pressure immediately acts on the piston gears, raising the power output correspondingly. If the temperature rise could be disregarded, the compressor output could continue unchanged. However, available materials necessarily limit the temperature rise. Hence thermostat 86 operates to put additional stages of the compressor in operation through the functioning of relay 108 and high torque control 89. Relay 108 also closes a circuit which causes solenoid 110 to be actuated, thereby operating shaft 111 and levers 112, which force and maintain valve 74 of the first stage and valve 140 of the second stage open until the temperature in the first stage combustion chamber is reduced to normal, either by diminution of the fuel supply as the operator may close valve 98 or through the burning of the increased amount of fuel with the correspondingly increased amount of air now coming from the compressor.

As soon as the temperature falls sufficiently, thermostat 86 functions to cut off the operation of relay 108 and solenoid 110, thereby putting valves 74 and 140 back under the control of their respective cam shafts. This in turn brings the engine back to normal operating efficiency.

Conclusion

From the foregoing description it will be seen that means has been provided for continuous burning of fuel with an excess of air to provide a source of power in the form of heated compressed gas which is fed either intermittently or continuously to a positive displacement rotary type engine to do useful work. The power output provided by the burned gases acting on the rotary pistons will exceed the power requirements of the compressor and other auxiliary equipment to a degree sufficient to give satisfactory efficiency.

The controls are so arranged that as increased fuel is supplied to provide increased power, the air input in both the first and subsequent stages is correspondingly automatically increased, thereby limiting the temperature rise.

The size of the combustion chambers, the quantity of fuel, the pipe sizes, the volume of air to be supplied by the compressor, the piston areas, and the cylinder volumes are matters of calculation in the design of the engine, depending upon the service to which it is to be put and the efficiencies required. The operating temperatures will be determined both by the efficiency desired and the materials available for use in the engine construction. It will be appreciated that the efficiency will be greater as the operating temperatures are raised. It is proposed, therefore, to use materials that will permit the highest possible temperatures and pressures. As new materials may become available, the engine elements may be redesigned accordingly to take advantage of any improved properties.

I claim:

1. A rotary positive displacement gas engine, comprising rotary members providing a succession of expansion chambers, a combustion chamber external of said expansion chambers, a passage from said combustion chamber to said expansion chambers, a valve in said passage, means for synchronizing the movement of said valve with the movement of said rotary members so as to open said valve to admit gas into said expansion chambers and then to close said valve to permit the admitted gas to expand and do work on said rotary members, means for varying the fuel supply to said combustion chamber, and means for holding said valve open when the temperature in said combustion chamber increases above a predetermined degree.

2. A rotary positive displacement gas engine, comprising two parallel shafts, a pair of meshing piston gears on said shafts forming a first stage, another pair of meshing piston gears on said shafts forming a second stage, a closely fitting housing for said first and second stage piston gears, a first stage combustion chamber having a passage leading to said first stage piston gears, an exhaust passage from said first stage piston gears leading to a second stage combustion chamber, a passage from said second stage combustion chamber to said second stage piston gears, valves between said combustion chambers and their respective first and second stage piston gears, an air compressor driven by said engine for supplying compressed air to said first stage combustion chamber, a fuel supply and means for continuously introducing fuel into said first stage combustion chamber in an amount insufficient to burn completely all of said air supplied thereto, means for supplying fuel to said second stage combustion chamber for combustion with excess unconsumed oxygen reaching said second stage combustion chamber from said first stage, means for causing initial ignition in said first stage combustion chamber, and means for discontinuing the ignition means after the temperature in said first stage combustion chamber has reached a degree at which the combustion will maintain itself.

3. In a gas engine of the continuous combustion positive displacement type, a combustion chamber, a fuel pump for supplying fuel continuously to said combustion chamber, an air compressor supplying compressed air continuously to said combustion chamber, means for initiating continuous combustion of said fuel and compressed air mixture in said combustion chamber, a cylinder containing a piston having a substantially gas-tight fit therein, an inlet passage from said combustion chamber to said cylinder, a valve in said inlet passage, means for synchronizing the movement of said valve with the movement of said piston in said cylinder so as to open said valve to admit gas into said cylinder and then to close said valve to permit the admitted gas to expand and do work on said piston, means for automatically increasing the time said valve remains open in accordance with the temperature in the combustion chamber, said time being increased when said temperature has increased above a predetermined degree and an exhaust passage from said cylinder to the atmosphere.

4. In a gas engine of the continuous combustion positive displacement type, a combustion chamber, a fuel pump for supplying fuel continuously to said combustion chamber, an air compressor supplying compressed air continuously to said combustion chamber, means for initiating continuous combustion of said fuel and compressed air mixture in said combustion chamber, a cylinder containing a piston having a substantially gas-tight fit therein, an inlet passage from said combustion chamber to said cylinder, a valve in said inlet passage, means for synchronizing the movement of said valve with the movement of said piston in said cylinder so as to open said valve to admit gas into said cylinder and then to close said valve to permit the admitted gas to expand and do work on said piston, means for automatically increasing the time said valve remains open in accordance with the temperature in the combustion chamber, said time being increased when said temperature has increased above a predetermined degree, means associated with said compressor to vary the supply of air to said combustion chamber in accordance with the said temperature in said combustion chamber, said supply of air being increased when said temperature increases, and an exhaust passage from said cylinder to the atmosphere.

5. In a gas engine of the continuous combustion rotary positive displacement type, a combustion chamber, a fuel pump for supplying fuel continuously to said combustion chamber, an air compressor supplying compressed air continuously to said combustion chamber, means for initiating continuous combustion of said fuel and compressed air mixture in said combustion chamber, a rotary piston positioned in a close fitting housing with clearance therebetween so slight that there is substantially no leakage of gas past said rotary piston, an inlet passage from said combustion chamber to said rotary piston, a valve in said inlet passage, means for synchronizing the movement of said valve with the movement of said rotary piston so as periodically to open said valve to admit gas into said housing and then to close said valve to permit the gas to expand and do work on the rotary piston, means for automatically increasing the proportion of time during which said valve is held open under predetermined conditions of temperature in the said combustion chamber, and an exhaust passage from said housing to the atmosphere.

6. In a gas engine of the continuous combustion rotary positive displacement type, a combustion chamber, a fuel pump for supplying fuel continuously to said combustion chamber, an air compressor supplying compressed air continuously to said combustion chamber, means for initiating continuous combustion of said fuel and compressed air mixture in said combustion chamber, a rotary piston positioned in a close fitting housing with clearance therebetween so slight that there is substantially no leakage of gas past said rotary piston, an inlet passage from said combustion chamber to said rotary piston, a valve in said inlet passage, means for synchronizing the movement of said valve with the movement of said rotary piston so as periodically to open said valve to admit gas into said housing and then to close said valve to permit the gas to expand and do work on the rotary piston, means for automatically interrupting the valve synchronization when the temperature in the said chamber rises sufficiently, means associated with said compressor to vary the supply of air to said combustion chamber in accordance with said temperature in said combustion chamber, said supply of air being increased when said temperature increases, and an exhaust passage from said cylinder to the atmosphere.

7. In a gas engine of the continuous combustion rotary positive displacement type, comprising two or more similar stages, a first stage combustion chamber, a fuel pump for supplying fuel continuously to said first stage combustion chamber, an air compressor supplying compressed air continuously to said first stage combustion chamber in greater quantity than is required to burn all of the fuel supplied thereto, means for initiating continuous combustion of said fuel and compressed air mixture in said first stage combustion chamber, an inlet passage from said first stage combustion chamber to a first stage rotary piston in a close fitting housing with clearance therebetween so slight that there is substantially no leakage of gas past said rotary piston, an inlet passage from said combustion chamber to said rotary piston, a valve in said inlet passage, and means for synchronizing the movement of said valve with the movement of said rotary piston, means for automatically holding said valve open when the temperature in said combustion chamber rises above a predetermined degree, means associated with said compressor to vary the supply of air to said first stage combustion chamber as said combustion chamber temperature changes, an exhaust passage from said first stage rotary piston to a second stage combustion chamber, means for supplying fuel continuously to said second stage combustion chamber, means for igniting and thereafter maintaining continuous combustion of said fuel with the excess unconsumed oxygen reaching said second stage combustion chamber from said first stage rotary piston, a second stage rotary piston positioned in a close fitting housing with clearance therebetween so slight that there is substantially no leakage of gas past said second stage rotary piston, an inlet passage from said second stage combustion chamber to said second stage rotary piston, a valve in said second stage inlet passage, and means for synchronizing the movement of said second stage valve with the movement of said second stage rotary piston, and an exhaust passage from said second stage housing to the atmosphere.

8. The gas engine construction set forth in claim 1, in which said rotary members are substantially comprised of ceramic material.

9. In a gas engine of the continuous combustion rotary positive displacement type, a combustion chamber, a fuel pump for supplying fuel continuously to said combustion chamber, an air compressor supplying compressed air continuously to said combustion chamber, means for initiating continuous combustion of said fuel and compressed air mixture in said combustion chamber, a pair of meshing piston gears on parallel shafts with close fitting housings, the clearance between said gears and housings being such that the faces of the gears and the ends of certain of the teeth of the gears do not touch but so closely approach the inner surfaces of the housings that there is substantially no leakage of gas therebetween, said certain teeth being uniformly spaced and constituting piston teeth each of which is substantially longer than the other teeth therebetween, the said piston teeth of one gear immediately preceding in meshing relationship the corresponding piston teeth of the other gear during rotation, an inlet passage from said combustion chamber to one side of the meshing point of said meshing piston gears, a valve in said inlet passage, means for opening and closing said valve, said valve opening timed to occur whenever a pair of longer piston teeth straddle said inlet passage and thus to admit gas into the chamber formed by said straddling piston teeth and the meshing point of the gears, said valve timed to close shortly after its opening, thereby permitting the gas that has entered the said chamber to expand and turn said piston gears, and an exhaust passage leading from the opposite side of the meshing point of said meshing gears out of said housing.

10. In a gas engine of the continuous combustion positive displacement type, a combustion chamber, a fuel pump for supplying fuel continuously and directly to said combustion chamber, an air compressor supplying compressed air continuously to said combustion chamber, means for initiating continuous combustion of said fuel and compressed air mixture in said combustion chamber, a pair of piston gears with meshing teeth mounted on parallel shafts within close fitting housings, certain uniformly spaced piston teeth on each of said meshing piston gears being substantially longer than the remaining teeth therebetween, the said longer piston teeth of one gear immediately preceding in meshing relationship the corresponding longer piston teeth of the other gear during rotation, the clearance between said gears and housing being such that the faces of the gears and the ends of said longer piston teeth do not touch but so closely approach the inner surfaces of the housing that there is substantially no leakage of gas past the piston teeth, means for preventing the teeth of one of said gears from touching the teeth of the other of said gears during rotation thereof while holding them in such close proximity that there is substantially no leakage of gas past the meshing teeth, an inlet passage from said combustion chamber to one side of the meshing point of said meshing piston gear teeth, a valve in said inlet passage, means for opening and closing said valve, said valve opening timed to occur whenever a pair of piston teeth straddle said inlet passage, means for controlling the period during which said valve remains open, thus controlling the torque of the engine, said means controlled in turn by temperature operated means in said combustion chamber whereby said valve opening and closing will be interrupted under certain conditions of temperature in the said combustion chamber, and means controlled by the temperature in said combustion chamber for initiating means associated with said compressor to vary the supply of air to said combustion chamber in accordance with the temperature in said combustion chamber, said supply of air being increased when said temperature increases, and an exhaust passage leading from the opposite side of the meshing point of said meshing gears out of said housing.

ALBERT A. SHAMES.

REFERENCES CITED

The following references are of record in the file of this patent:

UNITED STATES PATENTS

| Number | Name | Date |
|---|---|---|
| 1,001,675 | Ostergren | Aug. 29, 1911 |
| 1,015,411 | Webb | Jan. 23, 1912 |
| 1,124,409 | Floyd | Jan. 12, 1915 |
| 1,135,648 | Ahlm | Apr. 13, 1915 |
| 1,251,132 | Taylor | Dec. 25, 1917 |
| 1,302,582 | Norman | May 6, 1919 |
| 1,510,688 | La Fon | Oct. 7, 1924 |
| 1,839,275 | Sweningson | Jan. 5, 1932 |
| 1,873,994 | Campbell | Aug. 30, 1932 |
| 1,904,070 | Morgan | Apr. 18, 1933 |
| 1,919,355 | Bancroft | July 25, 1933 |
| 2,011,420 | Samuelson | Aug. 13, 1935 |
| 2,078,957 | Lysholm | May 4, 1937 |
| 2,115,112 | Lysholm | Apr. 26, 1938 |
| 2,160,218 | Kingston et al. | May 30, 1939 |
| 2,164,462 | Lutschg | July 4, 1939 |
| 2,211,447 | Tumey | Aug. 13, 1940 |
| 2,305,311 | Jendrassik | Dec. 15, 1942 |

FOREIGN PATENTS

| Number | Country | Date |
|---|---|---|
| 19,123 | Great Britain | Oct. 25, 1900 |
| 163,309 | Great Britain | Jan. 12, 1922 |
| 464,475 | Great Britain | Apr. 16, 1937 |
| 649,381 | Germany | Aug. 21, 1937 |